A. R. CHAMBERS.
CONTROLLING MEANS FOR INTERNAL COMBUSTION ENGINES.
APPLICATION FILED MAR. 29, 1915.
1,213,152. Patented Jan. 23, 1917.
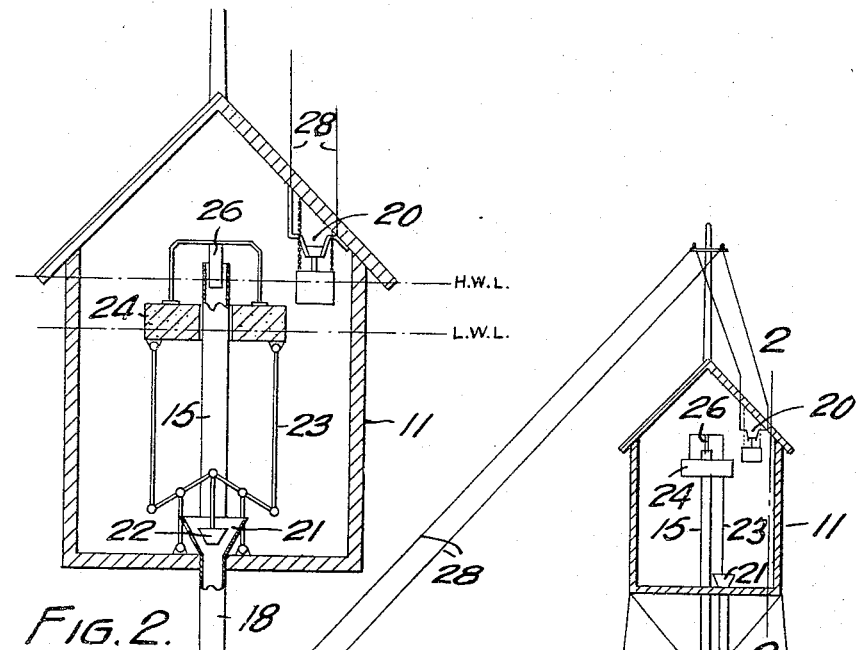
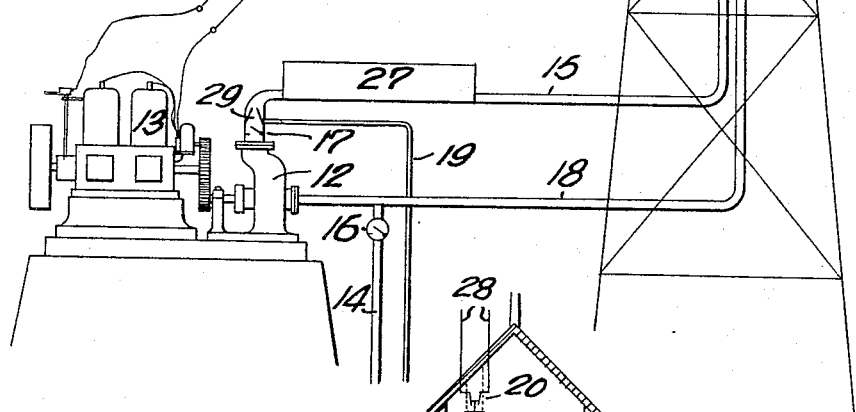

UNITED STATES PATENT OFFICE.

ALLISON R. CHAMBERS, OF NEW GLASGOW, NOVA SCOTIA, CANADA.

CONTROLLING MEANS FOR INTERNAL-COMBUSTION ENGINES.

1,213,152.  Specification of Letters Patent.  Patented Jan. 23, 1917.

Application filed March 29, 1915. Serial No. 17,799.

*To all whom it may concern:*

Be it known that I, ALLISON R. CHAMBERS, a citizen of the Dominion of Canada, residing at New Glasgow, in the Province of Nova Scotia and Dominion of Canada, have invented certain new and useful Improvements in Controlling Means for Internal-Combustion Engines, of which the following is a full, clear, and exact description.

This invention relates to improvements in controlling means for internal combustion engines, and the object is to provide means for automatically stopping and starting an internal combustion motor direct connected to a pump supplying railway and similar tanks. Heretofore, it has been impracticable to use internal combustion motors for operating such pumps, owing to the difficulty of automatically starting the motor. The question of stopping the engine is readily solved by the use of an electric ignition system, the circuit of which can be opened by a float in the tank when the water reaches a predetermined height. When, however, the motor is cold, it is impossible to start same by merely closing the ignition circuit, so that means must be provided to turn the motor over several times. This has been done by the use of much expensive additional machinery. The feature of this invention is to utilize the pump itself as a starting motor for the engine.

In the drawings which illustrate the invention, Figure 1 is a diagrammatic view of the device. Fig. 2 is a vertical sectional view of the tank on the line 2—2, Fig. 1. Fig. 3 is a modified form of starter.

Referring more particularly to the drawings, 11 designates an elevated tank, 12 a pump of suitable type, and 13 an internal combustion motor gear connected to drive the pump. The pump is provided with a suction pipe 14 and discharge pipe 15 leading to the tank. These pipes are each provided with check valves 16 and 17 respectively. An additional pipe 18 is provided leading from the bottom of the tank to the suction pipe between the check valve and pump. As soon as the pump stops, the discharge pipe 15 is emptied through a drain pipe 19. A float controlled circuit maker 20 is provided in the tank for opening and closing the ignition circuit of the engine. This circuit maker is arranged to operate on two or three inches rise or fall. The end of the pipe 18 within the tank is funnel-shaped, as shown at 21, and contains a valve 22 closing the pipe, which is controlled through suitable mechanism 23 from a large float 24. This float may conveniently be mounted to slide on the discharge pipe 15, which projects upwardly to nearly the top of the tank. The float also carries a plunger or piston 26 operating loosely in the top of the pipe 15. A small reception tank 27 is connected in the discharge pipe 15 as low down and close to the pump as possible. The circuit maker 20 is connected in the ignition circuit of the motor by wires 28.

The operation of the device is as follows:—When the water reaches high level, the float operates the circuit maker 20 to break the ignition circuit of the engine, so that the motor and pump are stopped. When a very little water is used and this float drops two or three inches, the ignition circuit is closed, but the motor being cold will rarely start. As the water is being used out of the tank, the discharge pipe of the pump is drained through the pipe 19. When the water reaches low level, the float 24 opens the valve 22 and permits water from the tank to flow down through the pipe 18 and into the suction side of the pump. The check valve in the suction pipe prevents this water flowing back into the well, so that the head of water between the tank and pump gives sufficient pressure to operate the pump as a motor in its normal direction and thus turn over the engine. The exhaust water from the pump flows out through the discharge pipe and accumulates in the tank 27. The pump will continue to operate as a starting motor until the water rises in the discharge pipe to the level of the tank, when the pressure would become balanced and the pump stopped. This possibility is eliminated by use of the tank 27, which prevents any appreciable pressure occurring on the discharge side of the pump before the motor starts. As soon as the motor starts, the rush of water up the discharge pipe 15 strikes the piston 26 and raises the float 24, so that the valve 22 is closed and the pump draws water through its suction pipe, and not from the tank. A Venturi arrangement 29 at the junction of the discharge and drain pipes prevents the water being pumped out through the drain pipe. As the distance fixed between high and low water is comparatively little, the float 24 will very quickly be supported by the rising water, and relieve back pressure caused by the piston 26 in the discharge pipe of the pump.

In the arrangement shown in Fig. 3, the valve 22 in place of being controlled by the float 24 is opened by a positive connection 30 with the discharge spout 31. This connection may be in the form of a slack cable which will open the valve when the spout is lowered nearly to the limit of its travel and the slack taken up. The advantage of this arrangement is that the motor should start immediately, and if it fails, may be reported at the next station as being out of order by the train taking water.

Having thus described my invention, what I claim is:—

1. In a device of the character described, the combination with an elevated tank of an internal combustion motor, a pump connected thereto and arranged to force water into said tank, a pipe extending from the tank to the intake of the pump, a float controlled valve in the tank arranged to admit water from the tank to said pump when the water level reaches a predetermined point, whereby the pump will operate as a starting device for the motor, and means for closing said valve when the pump commences to function normally.

2. In a device of the character described, the combination with an elevated tank of an internal combustion motor, a pump connected thereto and arranged to force water into said tank, a pipe extending from the tank to the intake of the pump, a float controlled valve in the tank arranged to admit water from the tank to said pump when the water level reaches a predetermined point, whereby the pump will operate as a starting device for the motor, a low down tank in the discharge line of the pump arranged to receive the discharge of the pump functioning as a motor starter, and means for automatically draining the discharge line and low down tank between the periods of pump operation.

3. In a device of the character described, the combination with an elevated tank, of an internal combustion motor, a pump connected thereto, a discharge pipe from the pump extending nearly to the top of the tank, a pipe extending from the bottom of the tank to the intake of the pump, a float controlled valve in said latter pipe closable by flow of water through the discharge pipe, a low down tank in the discharge pipe for reception of water passed through the pump from said second pipe, means for draining the discharge pipe and low down tank during rest periods of the pump, and a float controlled device arranged to break the ignition circuit of the motor when water rises to a predetermined level in the overhead tank.

In witness whereof, I have hereunto set my hand, in the presence of two witnesses.

ALLISON R. CHAMBERS.

Witnesses:
MARY S. FREEMAN,
GEO. W. SEMUS.

Copies of this patent may be obtained for five cents each, by addressing the "Commissioner of Patents, Washington, D. C."